Figure 1:
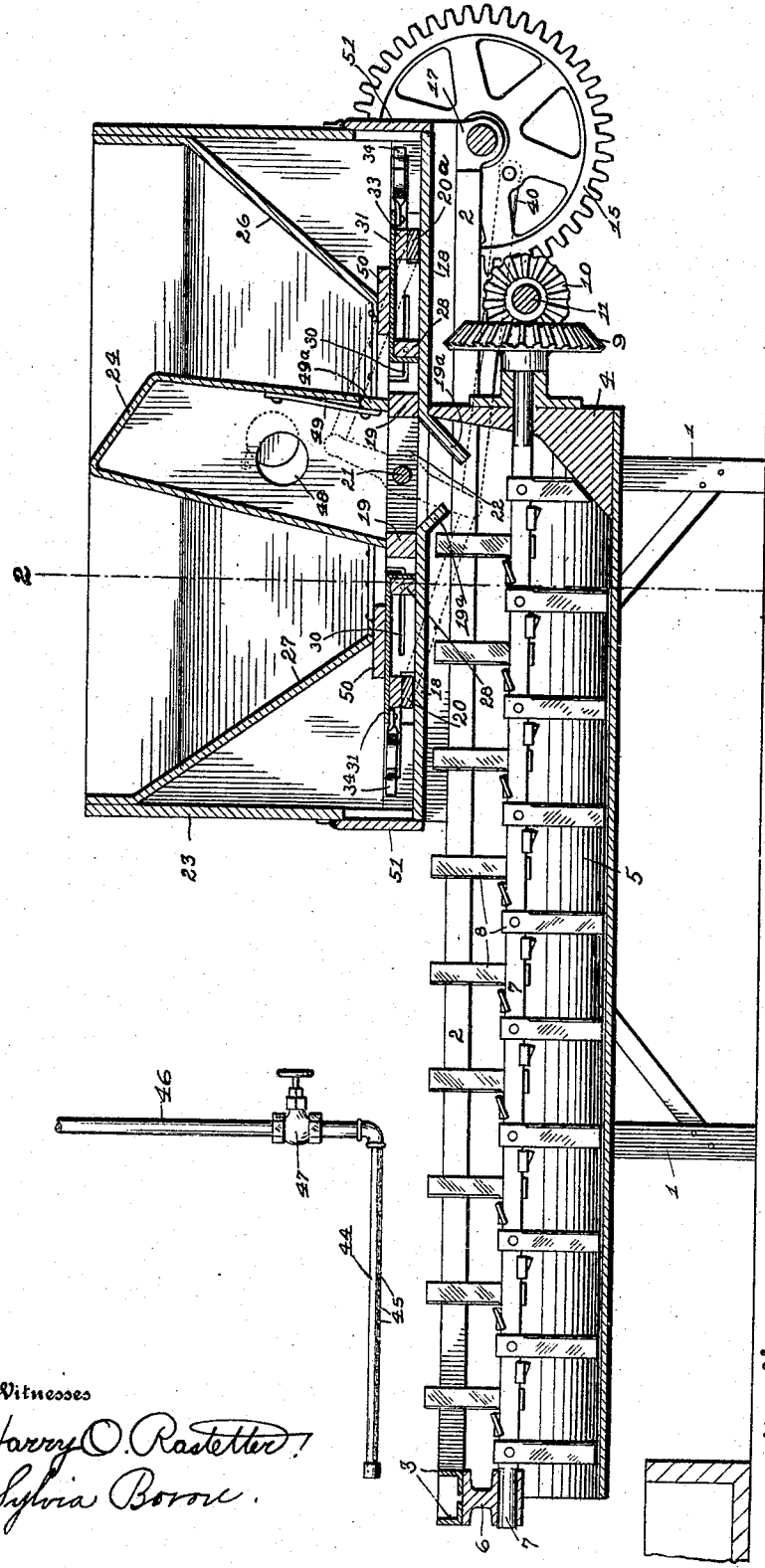

H. C. BAXTER.
FEEDING DEVICE FOR CEMENT MIXERS.
APPLICATION FILED JUNE 16, 1908.

942,051.

Patented Dec. 7, 1909.
3 SHEETS—SHEET 1.

Witnesses
Harry O. Rastetter
Sylvia Borow

Inventor
Homer C. Baxter

By
Bond & Miller
Attorneys

H. C. BAXTER.
FEEDING DEVICE FOR CEMENT MIXERS.
APPLICATION FILED JUNE 16, 1908.
942,051.
Patented Dec. 7, 1909.
3 SHEETS—SHEET 2.
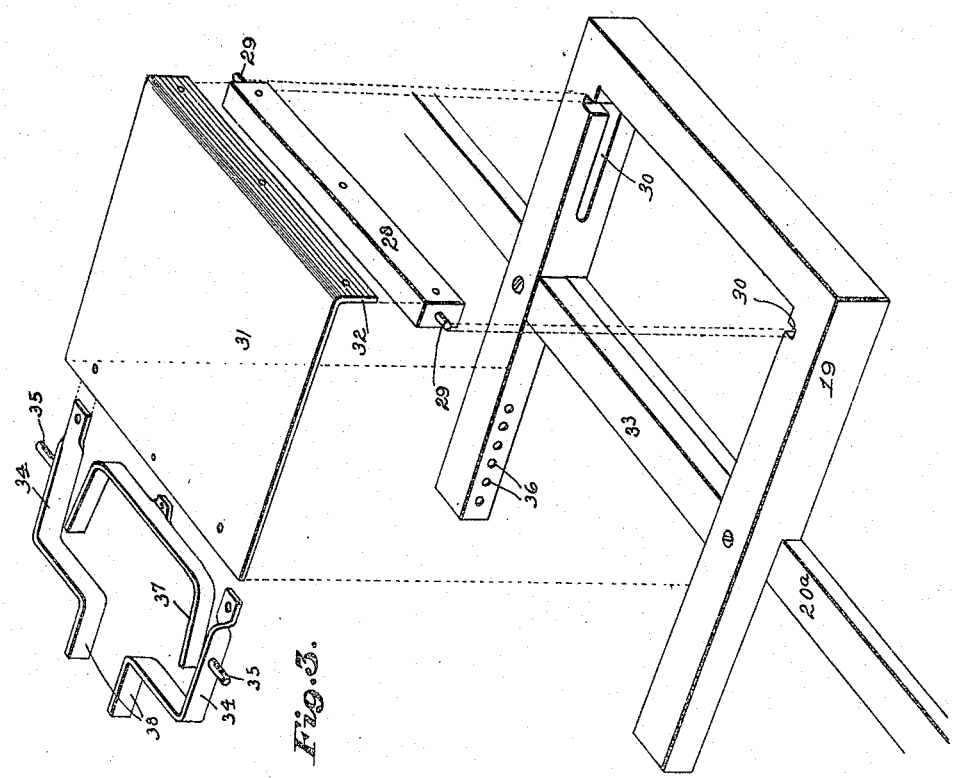
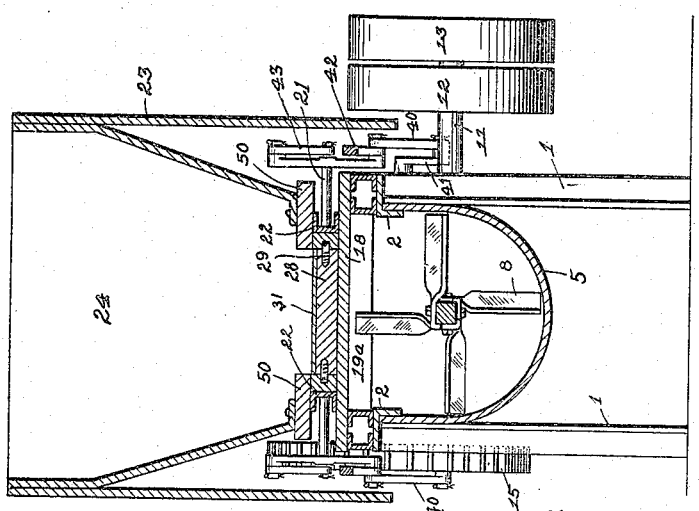

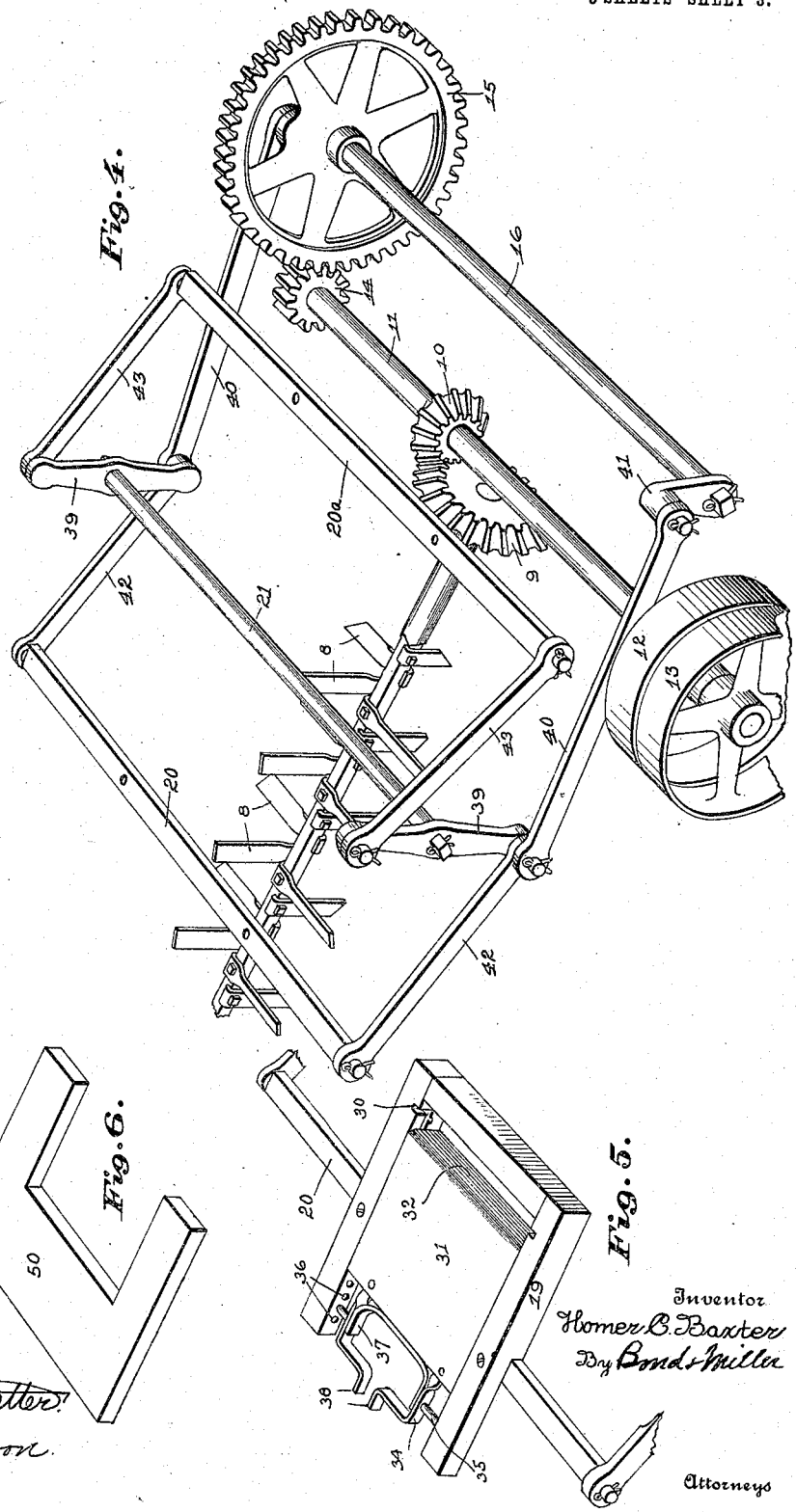

UNITED STATES PATENT OFFICE.

HOMER C. BAXTER, OF KENT, OHIO.

FEEDING DEVICE FOR CEMENT-MIXERS.

942,051.　　　　　Specification of Letters Patent.　　　Patented Dec. 7, 1909.

Application filed June 16, 1908. Serial No. 438,751.

*To all whom it may concern:*

Be it known that I, HOMER C. BAXTER, a citizen of the United States, residing at Kent, in the county of Portage and State of Ohio, have invented certain new and useful Improvements in Feeding Devices for Cement-Mixers; and I do hereby declare that the following is a full, clear, and exact description of the same, reference being had to the accompanying drawings, making a part of this specification, and to the numerals of reference marked thereon, in which—

Figure 1 is a longitudinal section showing the different parts properly arranged with reference to each other. Fig. 2 is a transverse section on line 2—2, Fig. 1. Fig. 3 is a view showing one of the reciprocating mixing frames, showing the parts pertaining thereto detached from each other. Fig. 4 is a perspective skeleton view of the moving parts designed to impart reciprocating movement to the mixing frames. Fig. 5 is a perspective view of one of the reciprocating frames. Fig. 6 is a detached view of one of the reciprocating mixing frame guides.

The present invention has relation to feeding device for cement mixers and it consists in the novel arrangement hereinafter described and particularly pointed out in the claims.

Similar numerals of reference indicate corresponding parts in all the figures of the drawings.

In the accompanying drawing, 1 represents the legs or standards, to the top or upper ends of which are attached the side or longitudinal angle bars 2, which are formed of a length to correspond substantially with the length of the machine. These angle bars are tied together at their ends by means of suitable tie bars 3 and the head 4. The bars 2 and the tie bars 3 constitute a rectangular frame, which carries the various parts designed to be connected thereto. To the legs or standards, 1, is attached in any convenient and well known manner the trough 5, which trough is formed of a length to correspond substantially with the length of the mixing portions of the machine proper. In the head 4 and the downward extending bar 6 secured to a tie bar 3 is journaled the shaft 7, which shaft is provided with the mixing blades 8, upon the shaft 7 is securely mounted the bevel gear 9, which gear wheel meshes with the bevel gear 10, said gear wheel 10 being securely mounted upon the power shaft 11, to which power shaft is attached the fast and loose pulleys 12 and 13. The power shaft 11 is journaled in suitable bearings carried by the side bars 2 or their equivalents. These bearings are not illustrated as they are of common construction such as are used in machines of this class and kind. The power shaft 11 is provided with the pinion 14, which pinion meshes with the gear wheel 15, securely mounted upon the crank shaft 16, said crank shaft being journaled in suitable bearings 17 on the frame of the device. Above the trough 5 are located the plates 18, which plates are each provided with the downward inclined flanges 19$^a$, which flanges are spaced apart from each other whereby an opening is provided for the passage of sand and cement into the mixing trough 5. Upon the plates 18 are located the frames 19, to which frames are securely attached the bars 20 and 20$^a$, which bars are for the purpose of imparting reciprocating movement to the frames 19 as hereinafter described. The rock shaft 21 is journaled in the channel bars 22 or their equivalents, which channel bars are supported by the plates 18 or their equivalents. Above the base plates 18 and above the reciprocating frames 19 is located the box 23 which box is provided with the partition 24, which partition will be more fully described hereinafter. Within the box 23 are located the inclined bottoms 26 and 27, which inclined bottoms together with the sides of the box and the partition constitute two receptacles one for cement and the other for sand. To the reciprocating frames 19 are adjustably attached the bars 28 which bars are provided with the pins 29, which pins are adapted for engagement with the bayonet slots 30 formed in the inner faces of the frame 19.

To the bars 28 are securely attached the plates 31 by means of the angled flanges 32 or their equivalents. The opposite ends of the plates 31 are connected to or rest upon the bars 33 or their equivalents. For the purpose of providing passages for the sand and cement designed to be mixed together the bars 28 are spaced from the inner ends of the frames 19 and for the purpose of adjusting the size of the passages and thereby regulating the quantity of the sand and cement designed to be conveyed to the mixer proper the plates 31 together with the bars 28 are adjustably connected.

For the purpose of holding the plates 31 in fixed adjustment said plates are provided with the pivoted arms 34, which pivoted arms are provided with the pins 35, said pins being for the purpose of engaging the desired apertures 36 located in the frames 19. Between the bars 34 is located the spring 37, which spring is for the purpose of normally holding the pins 35 in engagement in the apertures 36.

For the purpose of providing means for compressing the springs 37 the bars 34 are provided with the extensions 38, which extensions are designed to be gripped by the hand, and moved toward each other a sufficient distance to disengage the pins 35 from the apertures 36 after which the plates 31 can be brought into any desired adjustment thereby adjusting the size of the passages for the cement and sand. It will be understood that owing to the fact that the plates 31 are adjustable independent of each other the proportion of sand and cement can be varied from time to time by changing the size of the openings or passages in the frames 19.

In order to impart a reciprocating movement to the frames 19 together with the different parts carried thereby, the rock shaft 21 is provided with the rock arms 39 to the bottom or lower end of which rock arms are connected the pitmen 40, which pitmen are journaled to the cranks 41 secured to the shaft 16. From the bottom or lower ends of the rock arms 39 extend the links 42, which links are connected to the bar 20. To the top or upper ends of the rock arms 39 are connected the links 43, which links are pivotally connected to the bar 20<sup>a</sup>.

It will be understood that by connecting the links 42 and 43 to the top and bottom ends of the rock bars 39 the bars 20 and 20<sup>a</sup> will move in opposite directions; that is to say they will alternately move toward each other and away from each other so that the reciprocating frames 19 together with the different parts move toward each other and away from each other alternately, thereby bringing the openings or passages under the sand and cement receptacles simultaneously so that the sand and cement will be dropped into the trough at one and the same time, thereby insuring a better commingling owing to the fact that sand and cement are to a certain extent mingled together at the time they enter the trough and by a further agitation of the sand and cement by means of the rotation of the shaft 7 and the blades 8, a thorough commingling of the sand and cement takes place. It is well understood that better results are produced by first mingling the sand and cement together while in a dry state and after a partial mingling to add the water. In order to provide for the first mingling of the sand and cement together while dry the water pipe 44 is provided with the spray openings 45 which pipe is so located that no water will be supplied until after the sand and cement have been mixed while in a dry state.

It will be understood that the pipe 44 is to lead to and be connected to a supply pipe 46, which is to be provided with an ordinary valve 47. The partition 24 is formed hollow and is so formed for the purpose of holding the sand and cement entirely separate at a point above the place where the sand and cement falls into the trough. A further purpose of forming the partition as above described is to provide means for inspecting from time to time the proper working of the parts designed to feed the sand and cement, and in order to provide for this inspection one or both sides of the box 23 are provided with the sight apertures 48. The side of the partition adjacent the sand receptacle is slightly inclined toward the inclined bottom 26 and is so formed for the purpose of preventing the sand from lodging or what might be termed banking so as to interrupt the free movement of the sand through the openings in the reciprocating frames.

For the purpose of preventing any injury to the side of the partition adjacent the sand receptacle in case gravel should be wedged between the partition and the outer end of the reciprocating frame, the spring or springs 49 are provided, which springs are connected to the inner side of the partition adjacent the sand aperture and their lower free ends connected to the bar 49<sup>a</sup> by which arrangement an ordinary safety gate is produced.

For the purpose of better holding the reciprocating frames so that they will move in true horizontal planes the guide plates 50 are provided, which guide plates are located just above the reciprocating frames. These guide plates also serve as bottoms for the sand and cement receptacles and are attached in any convenient and well known manner.

For the purpose of providing a means of easy access to the box 23 for the purpose of changing the adjustment of the plates 31, said box is provided with the hinged doors 51, which doors are located substantially as shown in Fig. 1.

Having fully described my invention what I claim as new and desire to secure by Letters Patent, is—

1. In a feeding device for cement mixers, the combination of a frame, spaced base plates carried by the frame, said base plates provided with downwardly inclined inner ends, reciprocating frames mounted upon the base plate, bars adapted to actuate said reciprocating frames and means for actuating the bars in opposite directions, guide-plates located above the reciprocating frames, plates adjustably attached to the reciprocating frames and means for holding said plates in fixed adjustment, a box located above the reciprocating frames, said box provided with an open partition, said reciprocating frames located below the box and upon opposite sides of an opening between the spaced plates, and a mixer located below the spaced base plates, substantially as and for the purpose specified.

2. In a feeding device for cement mixers, the combination of a frame, spaced base plates carried by the frame, said base plates provided with downwardly inclined inner ends, reciprocating frames mounted upon the base plate, bars adapted to actuate said reciprocating frames and means for actuating the bars in opposite directions, guide-plates located above the reciprocating frames, plates adjustably attached to the reciprocating frames and means for holding said plates in fixed adjustment, a box located above the reciprocating frames, said box provided with an open partition, said open partition provided with sight apertures, said reciprocating frames located below the box and upon opposite sides of an opening between the spaced plates, and a mixer located below the spaced base plates, substantially as and for the purpose specified.

3. In a feeding device for cement mixers, the combination of a frame, spaced base plates carried by the frame, reciprocating frames mounted upon the base plate, bars adapted to actuate said reciprocating frames and means for actuating the bars in opposite directions, guide-plates located above the reciprocating frames, plates adjustably attached to the reciprocating frames and means for holding said plates in fixed adjustment, a box located above the reciprocating frames, said box provided with an open partition said reciprocating frames located below the box and upon opposite sides of an opening between the spaced plates, and a mixer located below the spaced base plates, substantially as and for the purpose specified.

In testimony that I claim the above, I have hereunto subscribed my name in the presence of two witnesses.

HOMER C. BAXTER.

Witnesses:
C. H. CURTISS,
SAMUEL H. FRIEND.